United States Patent
Choi et al.

(10) Patent No.: US 12,082,099 B2
(45) Date of Patent: Sep. 3, 2024

(54) METHOD OF PROVIDING IoT COMMUNITY SERVICE USING BEACON AND SYSTEM FOR THE SAME

(71) Applicant: HWACOM CO., LTD., Seoul (KR)

(72) Inventors: Jung In Choi, Anyang-si (KR); Seok Ki Kim, Seoul (KR)

(73) Assignee: HWACOM CO., LTD., Seoul (KR)

( * ) Notice: Subject to any disclaimer, the term of this patent is extended or adjusted under 35 U.S.C. 154(b) by 401 days.

(21) Appl. No.: 17/430,309

(22) PCT Filed: Sep. 4, 2020

(86) PCT No.: PCT/KR2020/011913
§ 371 (c)(1),
(2) Date: Aug. 11, 2021

(87) PCT Pub. No.: WO2022/019375
PCT Pub. Date: Jan. 27, 2022

(65) Prior Publication Data
US 2022/0303877 A1    Sep. 22, 2022

(30) Foreign Application Priority Data
Jul. 20, 2020    (KR) ........................ 10-2020-0089920

(51) Int. Cl.
H04W 48/12    (2009.01)
H04W 4/21    (2018.01)
H04W 4/50    (2018.01)
H04W 4/80    (2018.01)

(52) U.S. Cl.
CPC ............. *H04W 48/12* (2013.01); *H04W 4/21* (2018.02); *H04W 4/50* (2018.02); *H04W 4/80* (2018.02)

(58) Field of Classification Search
CPC ........... H04W 4/21; H04W 4/23; H04W 4/30; H04W 4/50; H04W 4/80; H04W 48/12; H04W 12/08; H04W 12/088
See application file for complete search history.

(56) References Cited

U.S. PATENT DOCUMENTS

| | | | |
|---|---|---|---|
| 9,282,582 B1 * | 3/2016 | Dunsbergen | H04W 48/12 |
| 11,050,784 B1 * | 6/2021 | Mattison | H04L 63/108 |
| 2015/0289207 A1 * | 10/2015 | Kubo | H04W 4/029 |
| | | | 370/311 |
| 2015/0329121 A1 * | 11/2015 | Lim | H04M 1/72412 |
| | | | 701/36 |

(Continued)

FOREIGN PATENT DOCUMENTS

| | | | |
|---|---|---|---|
| KR | 101728115 B1 | 4/2017 | |
| KR | 101792772 B1 | 11/2017 | |

(Continued)

OTHER PUBLICATIONS

International Search Report of PCT/KR2020/011913, Apr. 15, 2021.

*Primary Examiner* — Jean A Gelin
(74) *Attorney, Agent, or Firm* — STIP Law Group, LLC

(57) ABSTRACT

The present invention relates to a method and system for providing an IoT community service using a beacon, and specifically, to a service providing method and system, which allows the beacon to broadcast an arbitrary packet using a Bluetooth network, and allows a user terminal receiving the packet to use the community service through a wide area network.

8 Claims, 13 Drawing Sheets

(56) References Cited

U.S. PATENT DOCUMENTS

| | | | | |
|---|---|---|---|---|
| 2016/0087959 | A1* | 3/2016 | Park | H04W 12/04 |
| | | | | 713/168 |
| 2017/0105171 | A1* | 4/2017 | Srivastava | H04L 67/63 |
| 2017/0164214 | A1* | 6/2017 | Hara | H04W 24/02 |
| 2017/0201441 | A1* | 7/2017 | Choi | H04W 12/12 |
| 2018/0288209 | A1* | 10/2018 | Kim | H04M 1/72415 |
| 2019/0130397 | A1* | 5/2019 | Hameed | G06Q 20/4015 |
| 2020/0042744 | A1* | 2/2020 | Duncan | G06F 21/79 |
| 2020/0184518 | A1* | 6/2020 | Bains | G06Q 10/00 |
| 2020/0386848 | A1* | 12/2020 | Wirola | G01S 5/02523 |
| 2021/0083784 | A1* | 3/2021 | Chae | H04W 4/80 |
| 2021/0289031 | A1* | 9/2021 | Elgarat | H04W 4/70 |
| 2021/0337460 | A1* | 10/2021 | Breaux, III | H04W 8/18 |

FOREIGN PATENT DOCUMENTS

| | | |
|---|---|---|
| KR | 20180041801 A | 4/2018 |
| KR | 101863284 B1 | 7/2018 |
| KR | 102117886 B1 | 6/2020 |

\* cited by examiner

METHOD OF PROVIDING IoT COMMUNITY SERVICE USING BEACON AND SYSTEM FOR THE SAME

CROSS-REFERENCE TO RELATED APPLICATIONS

This application is the U.S. National Phase under 35 U.S.C. § 371 of International Application No. PCT/KR2020/011913 filed on Sep. 4, 2020, which in turn claims the benefit of Korean Application No. 10-2020-0089920 filed on Jul. 20, 2020, the disclosures of which are incorporated by reference into the present application.

TECHNICAL FIELD

The present invention relates to a method and system for providing an IoT community service using a beacon, and specifically, to a service providing method and system, which allows the beacon to broadcast an arbitrary packet using a Bluetooth network, and allows a user terminal receiving the packet to use the community service through a wide area network.

BACKGROUND ART

In the present days, online community services are much invigorated, and life without community services through online has become common as much as hard to imagine. However, although the online community services have been developed greatly for a long time from the aspect of service diversity, internetworking of the online community services are still based only on the user's ID or phone number, and online networking is very difficult among those who do not know well unless there is a special circumstance.

On the other hand, in the present days, IoT technology is applied to a very wide range of fields, and the IoT technology greatly enhances convenience in the life of users. For example, various electronic products provided in a house may be controlled anytime and anywhere through an application installed in a user terminal, and it even reaches the level where a user may control the electronic products by conversing with an application artificial intelligence. Meanwhile, although the IoT technology provides convenience throughout our lives, utilization of the IoT technology has not been diversified except control of the electronic products described above.

The present invention has been proposed in view of the limitations of the online community services as described above and the limited utilization of current IoT technologies, and the present invention relates to a method and system which allows users to easily use community services with each other through a Bluetooth network without exchanging contact information or IDs among the users.

The present invention has been derived in view of these problems and invented to provide additional technical elements that can solve the problems described above and cannot be easily invented by those skilled in the art.

DISCLOSURE

Technical Problem

Therefore, the present invention has been made in view of the above problems, and it is an object of the present invention to allow a host of a beacon and users in the neighborhood of the beacon to use online community services in a simply way, and particularly, to allow the users to use community services such as conversing with each other or the like although they do not know each other's contact information or ID by using an advertisement packet (hereinafter, referred to as an ad packet) broadcast through a Bluetooth network between the beacon and a user terminal.

In addition, another object of the present invention is to implement a non-contact community environment throughout the society at a low cost. In other words, the object of the present invention is to implement an environment in which a user may easily converse with other external users without sharing a phone number or an ID and only by installing a beacon of a low price at a place desired by a host.

For example, the object is to make it possible to use online community services between a user and a host who have never met before through a beacon installed in a parked vehicle, a beacon installed in a restaurant, a beacon installed in an apartment, a beacon installed in a lecture room, or a beacon installed in a kiosk.

Meanwhile, the technical problems of the present invention are not limited to the technical problems mentioned above, and other technical problems not mentioned will be clearly understood by those skilled in the art from the following description.

Technical Solution

To accomplish the above objects, according to one aspect of the present invention, there is provided a method of executing an IoT community service using a beacon, the method comprising the steps of: allowing a device to receive a first ad packet broadcast from the beacon, through a Bluetooth network; allowing the device to request a service server participation in a community through a wide area network with reference to community information included in the first ad packet; and allowing the device to receive a community participation response from the service server.

In addition, in the method as described above, the ad packet may include a UUID for identifying the community service, and a community identifier for identifying a community established by the service server.

In addition, the beacon may be assigned with the UUID for identifying that the beacon is for providing the community service, and a unique serial number of the beacon.

In addition, in the method as described above, the beacon may be installed in a vehicle, and the community identifier may be a number, a character, or a combination of these for identifying the vehicle or a driver of the vehicle.

In addition, in the method as described above, the beacon may be installed in a workplace, and the community identifier may be a number, a character, or a combination of these for identifying the workplace or a manager of the workplace.

In addition, in the method as described above, the beacon may be installed in a house, and the community identifier may be a number, a character, or a combination of these for identifying the house, an electronic device installed in the house, or a resident of the house.

In addition, in the method as described above, the beacon may be installed in an elevator of a collective residential building, and the community identifier may be a number, a character, or a combination of these for identifying a management office of the collective residential building, an employee of the management office, or a manager in charge of maintenance of the elevator.

In addition, in the method as described above, the beacon may be installed in a lecture room, and the community identifier may be a number, a character, or a combination of these for identifying the lecture room, a title of a lecture provided in the lecture room, or a name of an instructor.

In addition, in the method as described above, the beacon may be carried by a user, and the community identifier may be a number, a character, or a combination of these for identifying the user or arbitrary goods or service specified by the user.

According to another aspect of the present invention, there is provided a method of registering a host to execute an IoT community service using a beacon, the method comprising the steps of: allowing a device to receive a beacon registration key from a user; allowing the device to transmit a host registration request, including at least one among user identification information, the beacon registration key, and a unique serial number of the beacon, to a service server; and allowing the device to receive a host registration response from the service server.

Advantageous Effects

According to the present invention, although a host of a beacon and users around the beacon have no acquaintance with each other at all, there is an effect of allowing them to easily converse through an online community service.

In addition, according to the present invention, there is an effect of implementing a non-contact community environment at a low cost.

In addition, according to the present invention, there is an effect of enhancing user's convenience in various living areas.

Meanwhile, the effects of the present invention are not limited to those mentioned above, and other technical effects not mentioned will be clearly understood by those skilled in the art from the following description.

DESCRIPTION OF SYMBOLS

Figure 1:
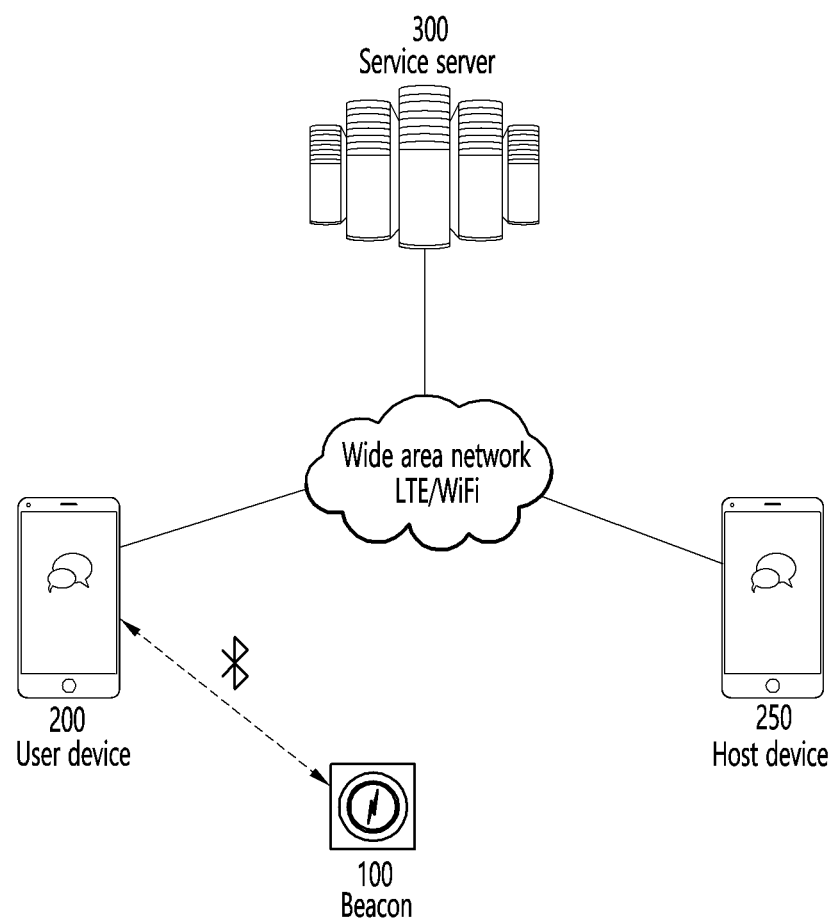
FIG. 1 is a view systemically showing a basic environment in which a community service according to the present invention is provided.

100: Beacon
200: User device
250: Host device
300: Service server
400: Database Mode for Invention The purpose and technical configuration of the present invention and the details of the effect according thereto will be more clearly understood by the following detailed description based on the drawings attached in the specification of the present invention. The embodiments according to the present invention will be described in detail with reference to the accompanying drawings.

The embodiments disclosed in this specification should not be interpreted or used as limiting the scope of the present invention. It is natural to those skilled in the art that the description including the embodiments of the present specification have various applications. Accordingly, arbitrary embodiments described in the detailed description of the present invention are exemplary to better describe the present invention and are not intended to limit the scope of the present invention to the embodiments.

The functional blocks shown in the drawings and described below are only examples of possible implementations. Other functional blocks may be used in other implementations without departing from the spirit and scope of the detailed description. Further, although one or more functional blocks of the present invention are expressed as individual blocks, one or more of the functional blocks of the present invention may be a combination of various hardware and software configurations that execute the same function.

In addition, an expression that includes certain components is an expression of an "open type" and simply refers to existence of the components, and should not be understood as excluding additional components.

Furthermore, when a component is referred to as being "connected" or "coupled" to another component, it should be understood that although the component may be directly connected or coupled to another component, yet another component may exist therebetween.

Hereinafter, the embodiments of the present invention will be described with reference to the drawings.

First, FIG. 1 shows a simplified system configured to understand the basic concept of an IoT community service according to the present invention. According to FIG. 1, the entire system may include a beacon 100, a user device 200, a host device 250, and a service server 200 capable of providing community service to the devices.

The present invention allows an arbitrary user (or users) existing around a beacon in an offline space to use community services such as chatting and sharing data online with a person who has installed a host of the beacon, i.e., the beacon, and established a community that can be connected through the beacon, by using a device, e.g., a smartphone, that the user carries. Particularly, the present invention allows the beacon 100 to broadcast an ad packet through the user terminal 200 and a short-range network (e.g., Bluetooth network), and allows the user terminal 200 to request the service server 300 participation in the community through a wide area network. For reference, FIG. 1 shows a view of connecting the beacon 100 and the user terminal 200 through a Bluetooth network, and a view of connecting the user terminal 200, the host terminal 250, and the service server 300 through a wide area network. As described, one of the most important features of the present invention is that a user device existing at a short distance around the beacon 100 may receive the ad packet broadcast from the beacon 100 and chat with the host device 250 with reference to the community information included in the ad packet.

Figure 2:
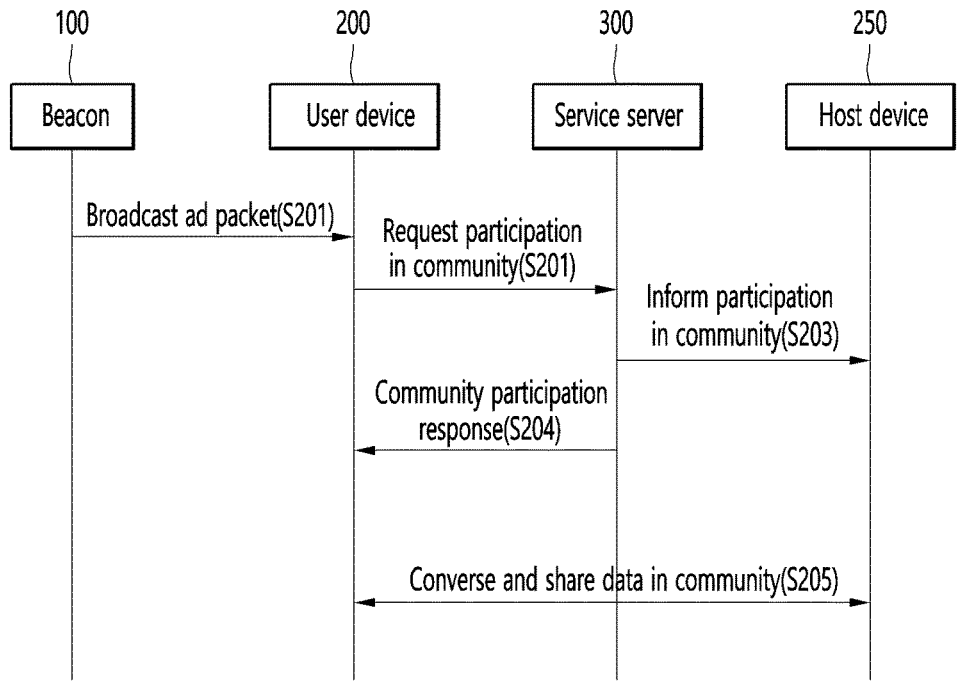
FIG. 2 is a view showing a first embodiment according to the present invention.

FIG. 2 shows a basic system for implementing the present invention, and it shows a process in which the user device 200 is allowed to use a community, i.e., to chat, together with the host device 250 as the user device 200 receives an ad packet from the beacon 100 and requests the service server 300 participation in the community.

Before describing in full scale, first, the devices and the service server mentioned in this detailed description may have the following hardware features.

First, in relation to the device (in this case, the device includes components referred to as a device in this detailed description, in addition to the user device and the host device), the device mentioned in the detailed description refers to an apparatus possessed or carried by a user, and this may include portable terminals such as smartphones, PDAs, and tablet PCs, as well as installation-type terminals such as home PCs or the like. Seeing the device from the aspect of an apparatus, it is assumed that each device has a central processing unit (CPU) and memory. The central processing unit may also be referred to as a controller, a microcontroller, a microprocessor, a microcomputer, or the like. In addition, the central processing unit may be implemented by hardware or firmware, software, or a combination these, and when the central processing unit is implemented using hardware, it may be configured as an application specific integrated circuit (ASIC) or a digital signal processor (DSP), a digital signal processing device (DSPD), a programmable logic device (PLD), or a field programmable gate array (FPGA), and when the central processing unit is implemented using firmware or software, the firmware or software may be configured to include a module, a procedure, a function or the like performing the functions or operations described above. In addition, the memory may be implemented as Read Only Memory (ROM), Random Access Memory (RAM), Erasable Programmable Read Only Memory (EPROM), Electrically Erasable Programmable Read-Only Memory (EEPROM), flash memory, Static RAM (SRAM), a hard disk drive (HDD), a solid state drive (SSD) or the like.

For reference, in this detailed description, it will be described assuming that the device is a portable device such as a smartphone or a tablet PC to help understanding of the present invention. The device may include a display and a touch-sensitive surface, and furthermore, one or more other physical user input means such as a physical keyboard, mouse and/or joystick may be further connected. In addition, the device may further include a means for sensing and recording sounds or voices. Meanwhile, various applications executed on the device may optionally use at least one universal physical user input means such as a touch-sensitive surface. One or more functions of the touch-sensitive surface and corresponding information displayed on the terminal may be optionally adjusted or changed from one application to a next application and/or within an individual application. In this way, the universal physical architecture of the device (such as the touch-sensitive surface) may optionally support a variety of applications using user interfaces that are intuitive and clear to users.

Meanwhile, the service server 300 is a configuration for providing a program, i.e., a set of instructions, for actually implementing the method according to the present invention, and furthermore, corresponds to a configuration for processing or storing various kinds of data received from a plurality of terminals. The service server 300 may be at least a server computer managed by a specific operator or may be a cloud server provided by another company, i.e., a cloud server that can be used by an operator after joining as a member. Particularly, when the service server is implemented as a server computer, the service server may include a central processing unit and memory, and as they are described above in detail in the description of the terminal, the description thereof will be omitted here.

The embodiment shown in FIG. 2 may also be understood as an embodiment in which an arbitrary user stays in the neighborhood of the beacon 100, and when it needs to communicate or share information with a host who has installed the beacon 100, the user attempts to chat with the host device 250 with reference to the community information included in the ad packet broadcast from the beacon 100. As an easier example, it relates to a situation in which an arbitrary user starts chatting with a host, who has installed the beacon 100, in an offline space.

The embodiment in FIG. 2 first starts from a step of receiving an ad packet from the beacon 100 by the user device 200 (S201). For reference, an application which allows using the IoT community service according to the present invention may be installed in the user device 200, and at this point, the application may be an installation file provided by the service server 300 or an installation file distributed or sold by the service server 300 to each user through another server of an application market or the like.

Figure 3A:
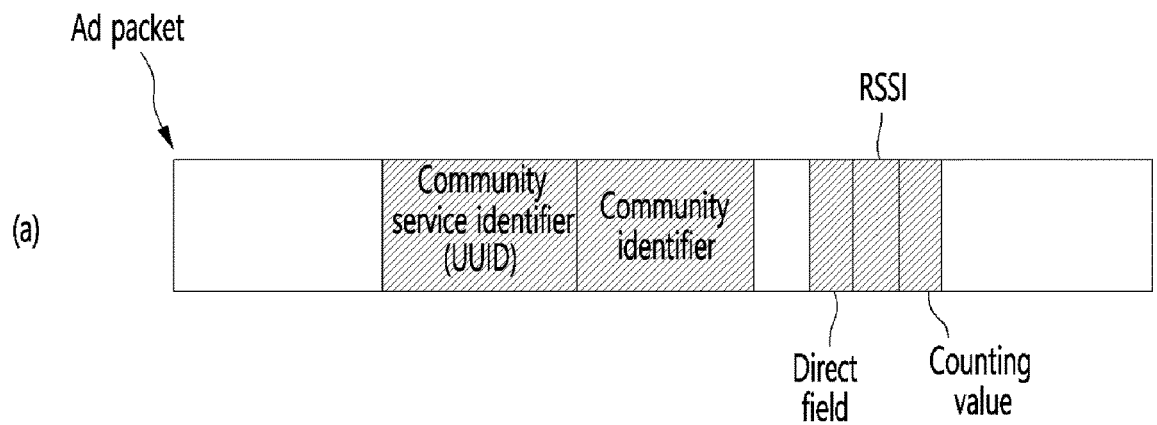
FIG. 3A and FIG. 3B are a view exemplarily showing the structure of an ad packet.

The ad packet may be understood as a data packet that continuously propagates the beacon 100 to the outside, and at this point, the structure of the ad packet may be formed to include information as shown in FIG. 3.

Referring to FIG. 3, the ad packet may basically include a UUID, which is an identifier for identifying a community service, and a community identifier for identifying a community established by the host, and in addition, the ad packet may further include at least one among a counting value (TTL) for controlling a range of broadcasting, i.e., the number of recipients receiving the ad packet by broadcasting, and a direct field for identifying whether the ad packet is broadcast directly from the beacon 100.

The UUID is a universal unique identifier, and serves as a unique name for identifying and distinguishing objects that do not known each other on a network. The term UUID or community service identifier referred in the detailed description may be an identifier for identifying that the beacon 100 or the device is for providing the IoT community service according to the present invention, and when the service server 300 receives a packet including the UUID, it may recognize that the packet includes a unique identifier used in the IoT community service according to the present invention.

In addition, the community identifier means a character and/or a number for distinguishing a large number of communities established by the service server 300 from each other, and the community identifier may be referred to as another term, such as a community ID, a chat room ID, a chat room identifier, or the like.

Meanwhile, in relation to the counting value, the counting value (TTL) is a value for limiting the number of recipients who receive an ad packet by broadcasting, and the user device 200 receiving the ad packet broadcast from the beacon 100 may broadcast the ad packet to other user devices (at this point, the ad packet includes community information the same as the community information of the ad packet broadcast from the beacon), and at this point, when the counting value in the ad packet initially broadcast from the beacon 100 is n, the devices receiving the ad packet may reduce the counting value by 1 and broadcast the ad packet to other devices. Then, when the counting value reaches 0 finally, the ad packet may not be broadcast any more. For example, when it is assumed that there is a plurality of user devices in the neighborhood of the beacon 100, and the counting value in a first ad packet broadcast from the beacon 100 is 3, an arbitrary user device receiving the first ad packet directly from the beacon 100 may generate and broadcast a second ad packet to other user devices, and at this point, the counting value in the second ad packet may be a value of 2. In addition, another user device receiving the second ad packet may also generate and broadcast a third ad packet having a counting value of 1 to other user devices. The counting value is for controlling the range of broadcasting in this way.

In relation to the direct field, in the present invention, it is possible to continuously broadcast through a Bluetooth mesh network using the counting value. In some cases, it may need to confirm whether an arbitrary user device, i.e., which node among arbitrary nodes, has received the ad packet directly from the beacon 100. Although the direct field will be set to a true value in the ad packet broadcast from the beacon 100, user devices receiving the ad packet may broadcast the ad packet by changing the value of the direct field to false. In this case, since only the nodes receiving the ad packet directly from the beacon 100 will have a true value in the direct field, it is possible to distinguish user devices closest to the beacon 100. In addition, as the devices receiving an ad packet in which the direct field is true may be estimated as being within a predetermined distance, for example, about 40 meters (this is a value that can be adjusted according to the intention of a designer) according to circumstances, various additional services or other additional information may be provided to the nearby devices.

In relation to the RSSI, the ad packet may include received signal strength indication (RSSI) information indicating received Bluetooth sensitivity (a degree of excellence of signal), and an approximate distance between the beacon 100 and the user device may be estimated through the RSSI. Preferably, distance estimation with reference to the RSSI may be implemented to be effective only when the user device receives the ad packet directly from the beacon 100, i.e., only when the direct field is true. Estimation of distance may be accomplished based on a data previously mapped between the RSSI and the distance, and for example, when the RSSI value is a1, the distance is b1 meter, and the RSSI value is a2, the distance is b2 meter, and so on. As such, the distance can be estimated based on previously measured or known mapping data. Meanwhile, distinguishing the devices adjacent to the beacon 100 and furthermore estimating the distances between the beacon 100 and the adjacent devices by inserting the direct field and the RSSI in the ad packet make it possible to provide each node with differentiated services within a network.

For reference, the structure of the ad packet in FIG. 3, i.e., the ad packet broadcast from the beacon 100, may be described in order of [UUID; Community identifier; Counting value; Direct field; RSSI] in a command (code) for actually driving software, and for example, may be described like [HWA_SVC; ROOM123; TTL=30; Direct=true; RSSI=−87 dbm]. In addition, for reference, a device receiving the ad packet will be able to participate in chat room ROOM123 provided by the community service called HWA_SVC. Furthermore, when the device receiving the ad packet broadcasts the ad packet to other user devices, it will broadcast the ad packet to other user devices after reducing the TTL value by 1. In addition, the device receiving the ad packet has received the ad packet directly from the beacon 100, and may be classified as being separated by a distance corresponding to signal sensitivity of −87 dbm.

Figure 3B:
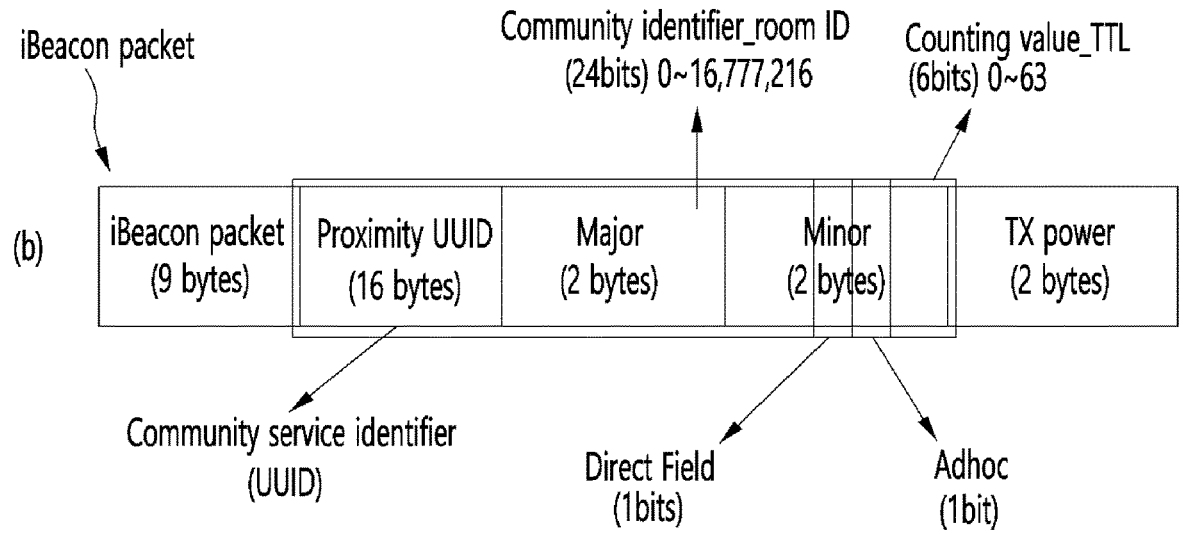

Meanwhile, in the method and system for providing an IoT community service according to the present invention, preferably, an ad packet may be generated with reference to the structure of an iBeacon packet. Apple's iOS provides a beacon function (iBeacon) at the OS level, and at this point, as a unique UUID may be assigned to a beacon service, when a UUID capable of identifying a service according to the present invention can be loaded on a beacon service packet of an OS company, this may also be used for the beacon 100 to broadcast an ad packet for inducing participation in a community to the devices in the neighborhood. More specifically, in this case, when an application for IoT community service according to the present invention is installed in a user device receiving a beacon signal containing an ad packet, the application may be automatically executed in the background of the OS although it is not in an execution state, and the application executed in the background outputs Local Notification on a corresponding device to induce the user to execute the application, and accordingly, the user may be induced to participate in the corresponding community with reference to the community identifier included in the ad packet. On the other hand, a user device receiving the ad packet in the background state may reduce the counting value (TTL) by 1 and broadcast the ad packet to another device according to circumstances, or reduce the counting value (TTL) by 1 and broadcast the ad packet to another device only when the application is executed according to circumstances. For reference, in the case of iBeacon, 24 bits out of 4 bytes of the Major and Minor fields may be allocated to the community identifier (chat room ID), 6 bits may be allocated to the counting value, and 1 bit may be allocated to the direct field as shown in FIG. 3(b), and additionally, 1 bit may be used as the stationary field for designation of a temporary group.

Referring to FIG. 2 again, after step S201, a step of transferring a community participation request to the service server 300 by the user terminal 200 may be performed (S202). The community participation request may include the community information included in the ad packet previously received from the beacon 100, a community identifier (chat room ID) among the community information.

Meanwhile, the service server 300 may inquire the community of the host corresponding to the beacon 100 with reference to the community identifier after receiving the community participation request, inform the host device 250 of existence of participants in the community after the inquiry (S203), and then allow or restrict entry of the user device 200 in the community by transferring a response about whether participation in the community is possible to the user device 200 (S204). After the user device 200 is allowed to enter the community, naturally, it is possible to use online community services such as conversation and data sharing between the user device 200 and the host device 250 (S205).

Meanwhile, in another embodiment different from the embodiment according to FIG. 2, it may be implemented to include a community service identifier (UUID) and a unique serial number of the beacon in the ad packet broadcast by the beacon 100, and at this point, the unique serial number of the beacon may be referred in identifying the community in the future. In other words, the user device 200 receives an ad packet from the beacon 100 at step S201, and at this point, the UUID and the unique serial number may be included in the ad packet, and at step S202, the user device 200 may request the service server 300 participation in the community while including the UUID and the unique serial number in the ad packet. Thereafter, at step S203, the service server 300 may inquire a community identifier that matches the unique serial number with reference to an internal or external DB (not shown), and inform the host device 250 corresponding to the inquired community identifier of participation in the community. In addition, the service server 300 may transmit a community participation response to the user device 200 to finally make a conversation between the user device 200 and the host device 250. In summary, in the modified embodiment described above, the ad packet includes a unique serial number, i.e., a unique device serial number given whenever a beacon 100 is manufactured, and as the unique serial number is used by the service server 300 to find a community identifier (chat room ID), a chat room established by the host can be found.

Figure 4:
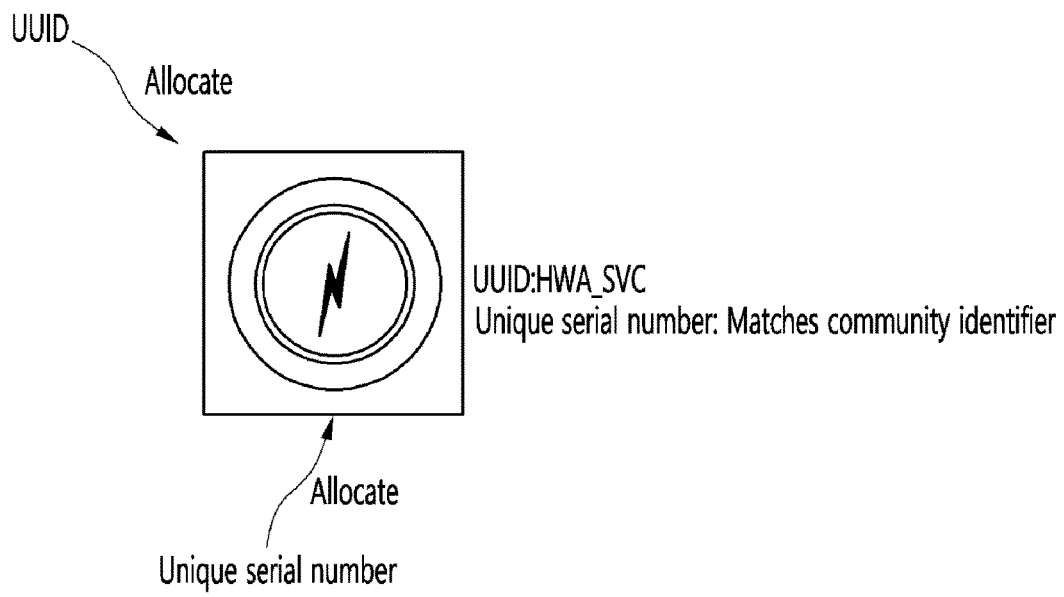
FIG. 4 is a view showing information that can be injected when a beacon is manufactured.

For reference, FIG. 4 is a conceptual view showing that a community service identifier UUID and a unique serial number may be assigned or allocated when the beacon 100 is manufactured, and for example, the UUID may be a character, a number, or a combination of these for identifying a HWA service (HWA_SVC), and the unique serial number matches the community identifier (chat room ID), which may be a character, a number, or a combination of these for identifying the beacon 100 or a community (chat room) in the future.

Figure 5:
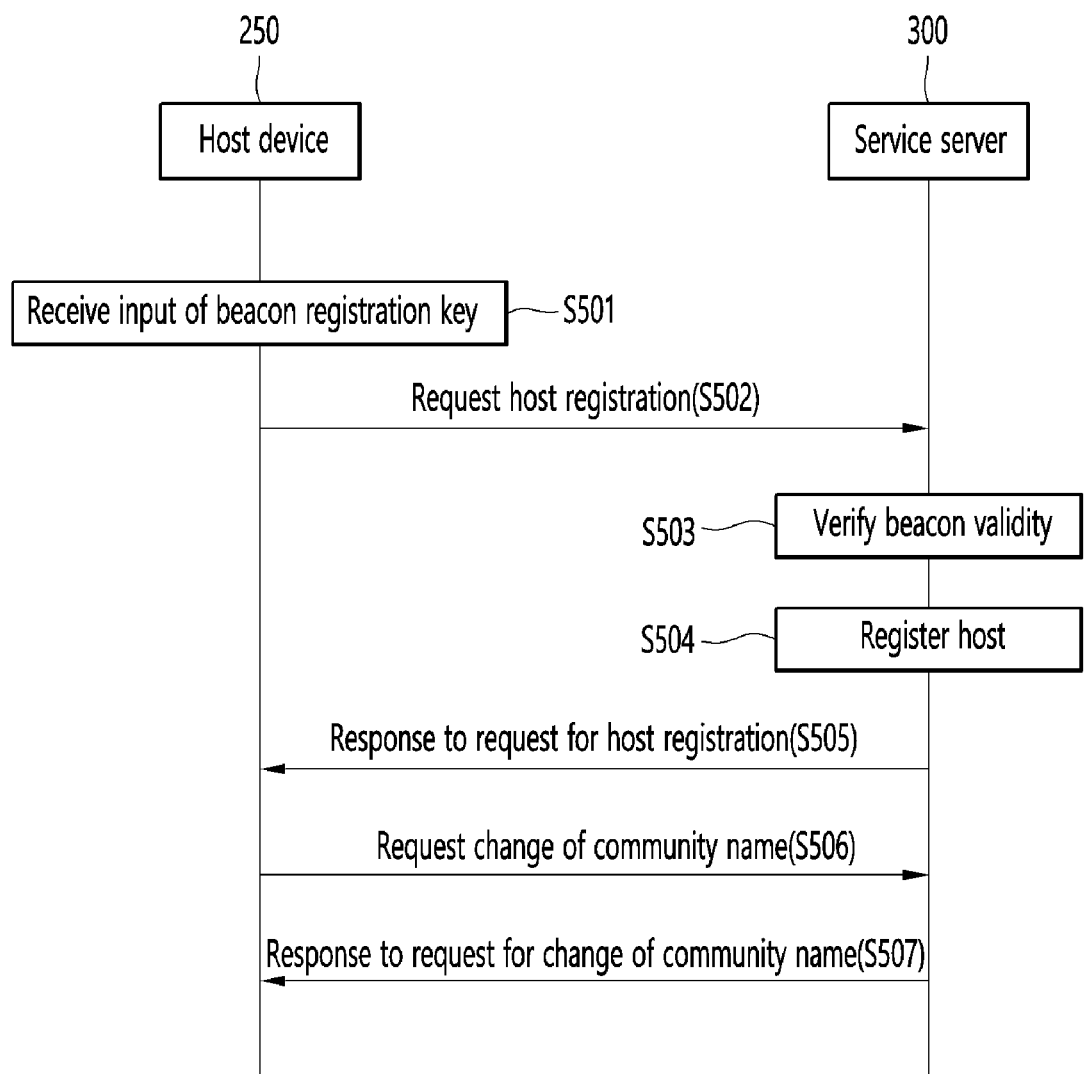
FIG. 5 is a view showing an example of using a UUID and an identifier in a process in which a user terminal receiving an ad packet requests a service server participation in a community.

FIG. 5 is a view showing a process in which a host registers the beacon 100 as a host device in the service server 300 after installing or providing the beacon 100 at an arbitrary location.

Referring to FIG. 5, first of all, the host device 250 may receive an input of a beacon registration key for registration of a beacon 100 from a host user, i.e., a user who has purchased or obtained the beacon (S501). For example, in order to use the HWA service, the host user may purchase a beacon assigned with a UUID corresponding to the HWA service through a store or Internet shopping, and when the beacon is purchased, the beacon registration key is packaged together to be used by the host user when the beacon is registered in the future. Alternatively, the beacon registration key may be transferred to a beacon buyer or a beacon acquirer in an online method.

After step S501, the host device 250 may transfer a host registration request to the service server (S502), and at this point, the host registration request may include at least one among user identification information, a beacon registration key, and a unique serial number of the beacon. Preferably, all of the above three pieces of information may be included. This is a step for a host user to establish a community (chat room) on the basis of the beacon 100, and the service server 300 may perform validity verification on at least one among the beacon registration key and the unique serial number of the beacon after receiving the host registration request (S503), and when it is determined that the beacon registration key or the unique serial number is valid, the host user may be registered as a true host (S504). In addition, of course, the device of the host user may be registered as a host device.

After step S504, the service server 300 may perform a step of informing the host device 250 of a host registration response, i.e., whether the host registration is successfully completed (S505).

Meanwhile, there may be a step of receiving an input of a community identifier from the host user after the above process is performed or at any time during the process, and the community identifier received in this way may be transferred to the service server together with a community name change request. That is, when the host user desires to induce participation of any other user device 200 through his or her beacon 100, more smooth participation may be induced by displaying his or her community identifier, i.e., a chat room ID, and for example, host user's convenience may be increased by allowing the user to freely determine the community identifier, such as a name of the host user, a chat room name desired by the host user, or the like.

The overall system and the service providing method of the IoT community service have been described above with reference to FIGS. 1 to 5.

Hereinafter, the fields to which the IoT community service providing method according to the present invention can be actually applied will be described with reference to the drawings.

Figure 6:
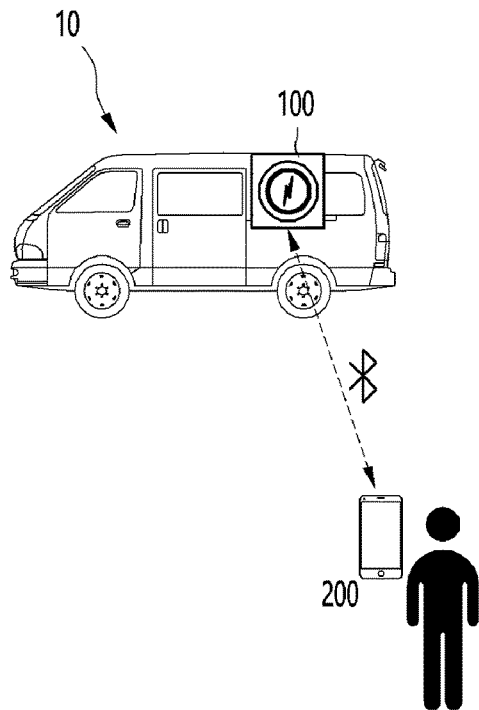
FIG. 6 is a view showing an embodiment in which a beacon is installed in a vehicle.
Figure 6:
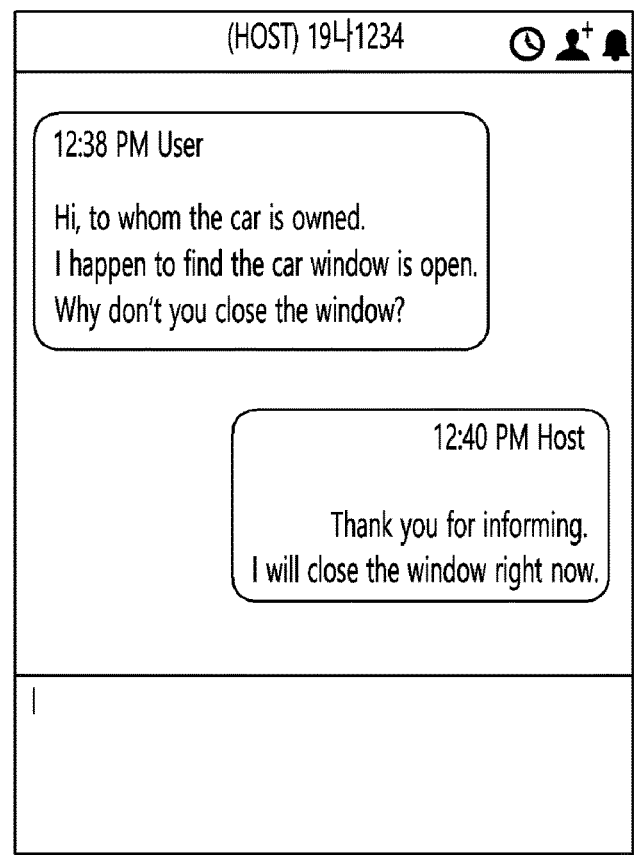

FIG. 6 is a view showing an application example in which a beacon is installed in a vehicle. Referring to FIG. 6, the beacon 100 may be provided inside or outside a vehicle 10, and the beacon 100 may be equipped with its own power supply means (a battery or the like) or may be connected to a constant power source provided by the vehicle 10 to continuously broadcast ad packets. The ad packet broadcast from the beacon 100 may reach the user device 200 of a user who passes by, and for example, when the vehicle 10 temporarily stops and the road is blocked by the vehicle 10, the user device 200 of a user may get in touch with the host, i.e., the owner, of the vehicle 10 through chatting by receiving the ad packet.

Specifically, the user and the host (vehicle owner) may converse through a step of receiving, by the user device 200, an ad packet from the beacon 100 provided in the vehicle 10, a step of requesting, by the user device 200, the service server 300 participation in a community with reference to the community information included in the ad packet, and a step of receiving, by the user device 200, a community participation response from the service server 300.

Meanwhile, when the ad packet is received from the vehicle 10, a number, a character, or a combination these capable of identifying the vehicle, the driver of the vehicle, or the owner of the vehicle may be displayed on the application of the user device 200. The number, the character, or the combination these may be a community identifier set in advance by the host of the beacon 100. As shown in FIG. 6, a license plate, such as "25 SEO OOOO", that can identify a corresponding vehicle may be displayed on the application of the user device 200 as the chat room title, and in this chat room, a user may easily transfer a message that the user desires to deliver to the host (vehicle owner), such as "The vehicle blocks the road", "There is a minor collision", "The window is open" or the like, and a response thereof may also be easily received in an interactive manner.

When the community service can be used by installing the beacon 100 in the vehicle 10 and broadcasting the ad packet as described above, there is an effect of increasing user's convenience in that the host (vehicle owner) may sufficiently get in touch with others without exposing his or her personal information including a phone number to the outside of the vehicle, and a general user passing by the vehicle may easily get in touch with the vehicle owner only by executing an application on his or her user device and looking for a chat room capable of identifying the vehicle or the vehicle owner without the need of checking whether a phone number is left on the windshield of the vehicle.

Figure 7:
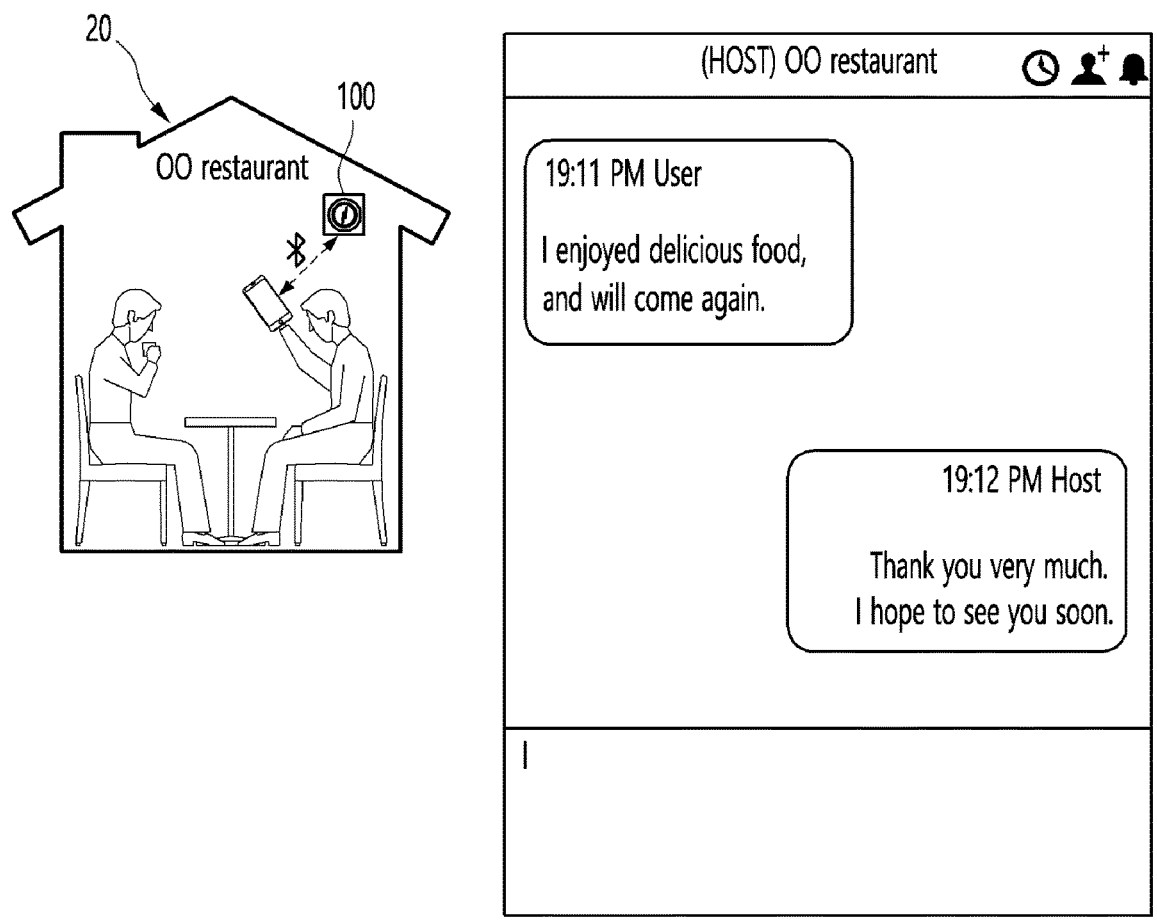
FIG. 7 is a view showing an embodiment in which a beacon is installed in a restaurant.

FIG. 7 is a view showing an application example in which a beacon is installed in a workplace. More specifically, FIG. 7 shows an example of a beacon 100 installed inside a restaurant 20, and the beacon at this point may also be implemented to be equipped with its own battery or connected to a power supply provided in the restaurant 20 to continuously broadcast ad packets. The ad packet broadcast from the beacon 100 may propagate to customers inside or outside the restaurant 20, and for example, the ad packet may propagate to user devices of customers ordering food in the restaurant, user devices of customers having additional comments while eating, user devices of customers waiting for entry outside the restaurant, and the like.

A number, a character, or a combination these that can identify the host of the beacon 100 may be displayed on the user device 200 of each customer, which may be a community identifier set in advance by the host. As shown in FIG. 7, on the application of the user device 200, the title of a chat room that can be entered by the restaurant beacon 100 may be made up of the name of the restaurant or a restaurant manager, such as "OO restaurant" or "LL restaurant manager". In this chat room, customers may freely communicate with the restaurant manager on the application of the user device 200 saying that "One ramen and one Gimbap, please", "I enjoyed delicious food.", "Ramen is a little bit spicy", or the like.

In addition, a guide robot may be disposed in various workplaces including a restaurant, and a beacon 100 may be installed in the guide robot. When the beacon 100 is installed in the robot, a user may enter a chat room allocated to the host of the robot, i.e., a robot manager, by using the ad packet received through a Bluetooth network.

When the beacon 100 is installed in a workplace and an IoT community service using a Bluetooth network is provided, there is an effect in that customers visiting the workplace may deliver necessary requests without deliberately contacting an employee and communicate with a workplace manager without exposing their identity if desired.

Figure 8:
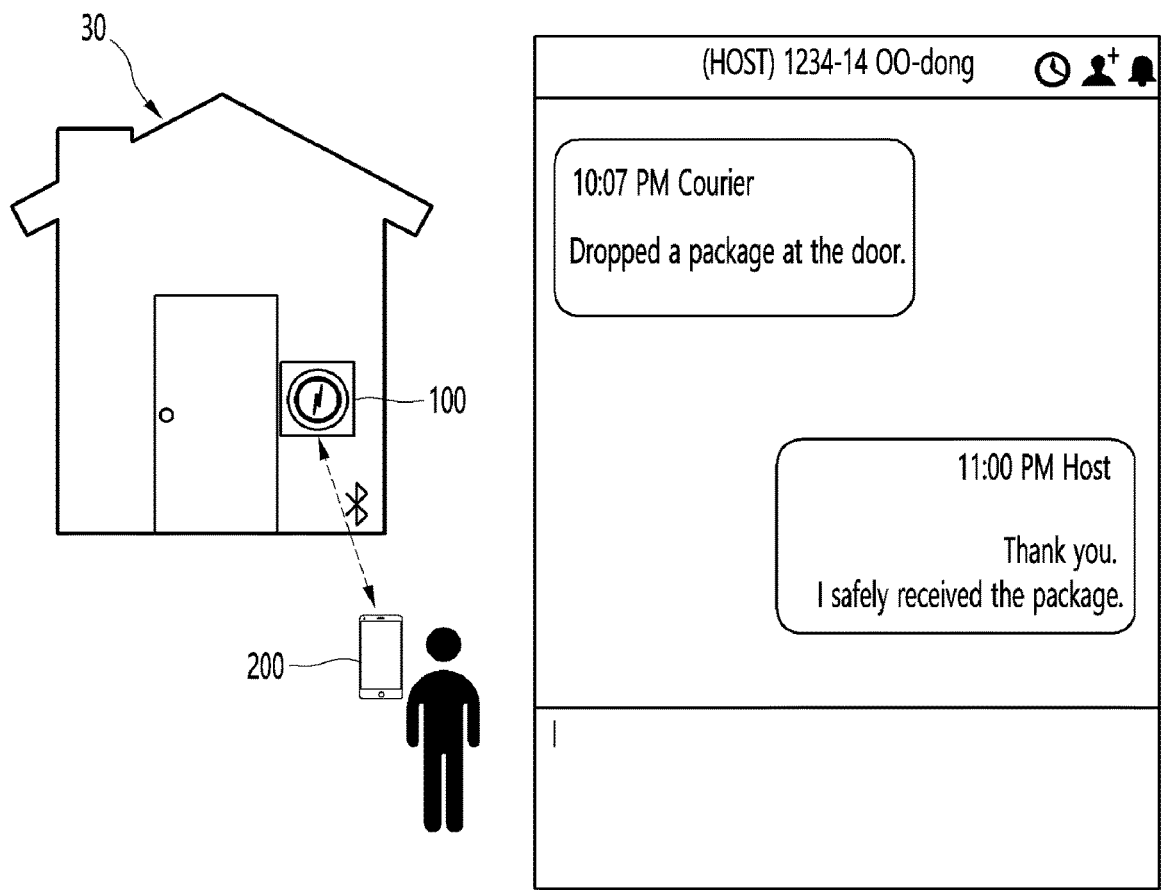
FIG. 8 is a view showing an embodiment in which a beacon is installed at the entrance of an apartment.

FIG. 8 is a view showing an application example in which a beacon is installed in a house. More specifically, FIG. 8 shows an example in which a beacon 100 is installed at the entrance door of a collective residential building 30 such as an apartment. Like the previous embodiment, conversation and data sharing with a host of the beacon 100, e.g., a resident of the house, may be possible using an ad packet broadcast by the beacon 100.

For example, when an employee of the management office needs to visit the house while the resident is out of home, the user device 200 of the employee of the management office may enter the community of the host with reference to the community information included in the ad packet received from the beacon 100. At this point, the employee of the management office may directly communicate with the resident although the employee does not know the contact information of the resident, and there is an effect of minimizing exposure of personal contact information or identity from the view point of the resident. In addition, when sending and receiving home delivery packages in the past, a recipient's phone number should be written on the packages, and particularly, when a courier needs to speak to the recipient, exposure of the phone number is inevitable in many cases. However, in the case of using the IoT community service according to the present invention, there is an effect of conversing and sharing data with a recipient in a chat room even when the package recipient's phone number is unknown. This may be greatly helpful in preventing crimes disguised as a courier, and is effective in that a home resident may safely receive home delivery packages.

Meanwhile, in the case of the beacon 100 installed in a house, a number, a character, or a combination of these capable of identifying the house or a resident of the house may be set as a community identifier. For example, it may be set as "OO Apartment 502-dong 501", "502-501 Kim OO", or the like, and visitors to the house may converse with the resident of the house by entering the chat room indicated by the community identifier.

Figure 9:
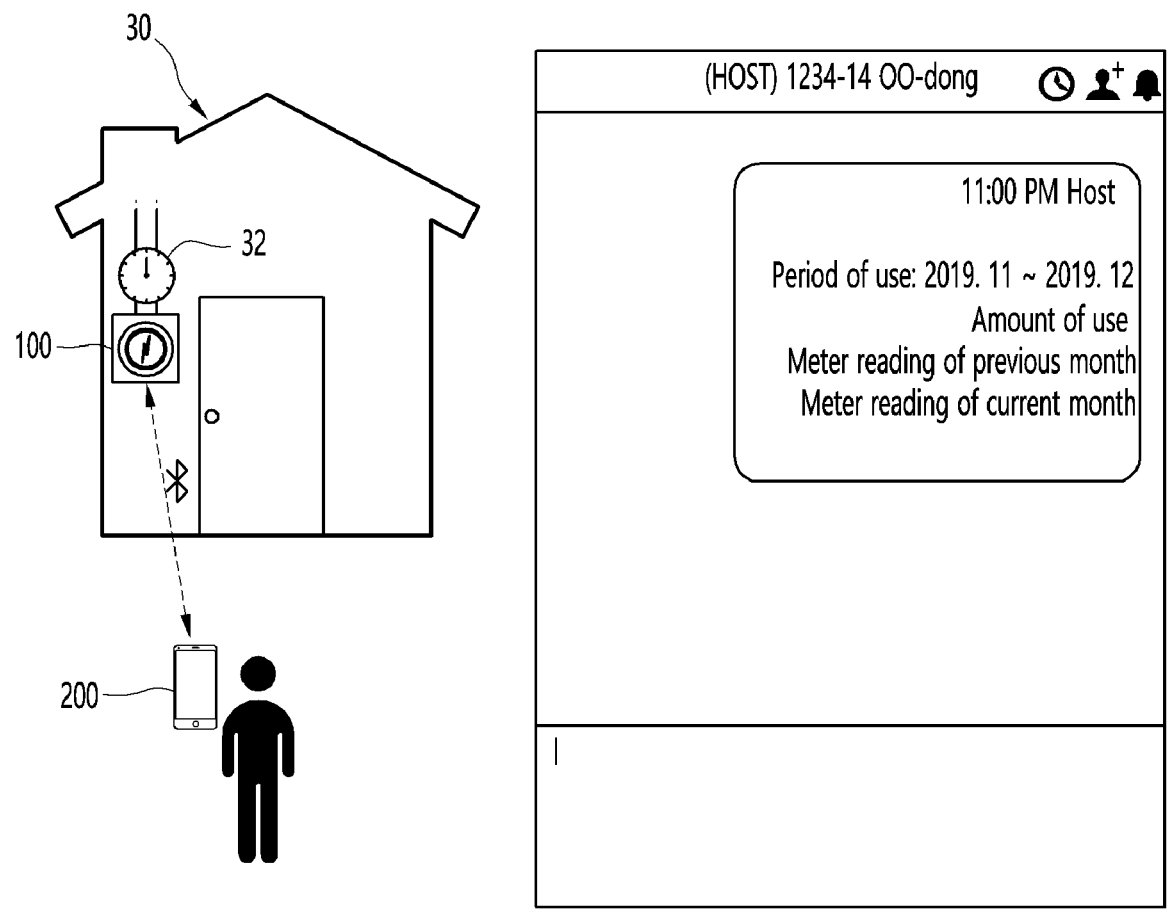
FIG. 9 is a view showing an example in which a beacon is installed in a measurement gauge of a house.

FIG. 9 is a view showing an application example in which a beacon 100 is installed in an electronic device provided in a house. Although the beacon 100 is matched to the one whole house 30 and used for providing the IoT community services shown in the embodiment of FIG. 8, there is a difference in that in the embodiment of FIG. 9, the beacon 100 is matched to a specific device in the house and used to provide IoT community services.

More specifically, FIG. 9 is a view showing a beacon 100 installed in a gas meter 32, and at this point, the beacon 100 may be embedded in the gas meter 32 or attached to the gas meter 32 afterwards (e.g., the beacon is inserted in the USB slot of the gas meter). The beacon 100 may be implemented to receive a value measured by the gas meter 32 and broadcast the value to the outside through an ad packet, or the beacon 100 may be implemented to broadcast community information that allows community connection to a host device, i.e., a device of the resident of the house, so that an external user device (e.g., a user device of a gas meter reader) may share a gas meter measurement value through data sharing with the host device. When the beacon 100 is installed in connection with the gas meter 32 in the house as described above, there is an effect of confirming a measurement value from the outside through a Bluetooth network although the gas meter reader does not go inside the house. Alternatively, although the gas meter reader does not visit, the host device 250 may immediately share the measurement value of the gas meter 32 with the gas company.

On the other hand, the beacon 100 may also be installed in an elevator of a collective residential building such as an apartment, and it may be implemented to allow an arbitrary user to communicate with an employee of the management office, i.e., a person in charge of managing the beacon 100, by performing Bluetooth communication with the beacon 100 installed in the elevator.

Meanwhile, although FIGS. 8 and 9 show application examples in which the beacon 100 is installed in a house or an electronic device in the house, it is understood that the IoT community service according to the present invention is not limited only to the application examples of a house. That is, when the installation location of the beacon 100 is extended to an area, a factory or the like without a local Internet, it is effective in that user devices existing in the neighborhood of a corresponding location may easily converse or share data with a remote host device only by allowing the beacon 100 to broadcast an ad packet at the location. In addition, from the view point of an engineer in charge of device maintenance, when the beacon 100 is provided in each device, a state value of each device may be easily obtained by simply connecting to a Bluetooth network, and thus the effect of facilitating the maintenance work for the devices may also be achieved.

Figure 10:
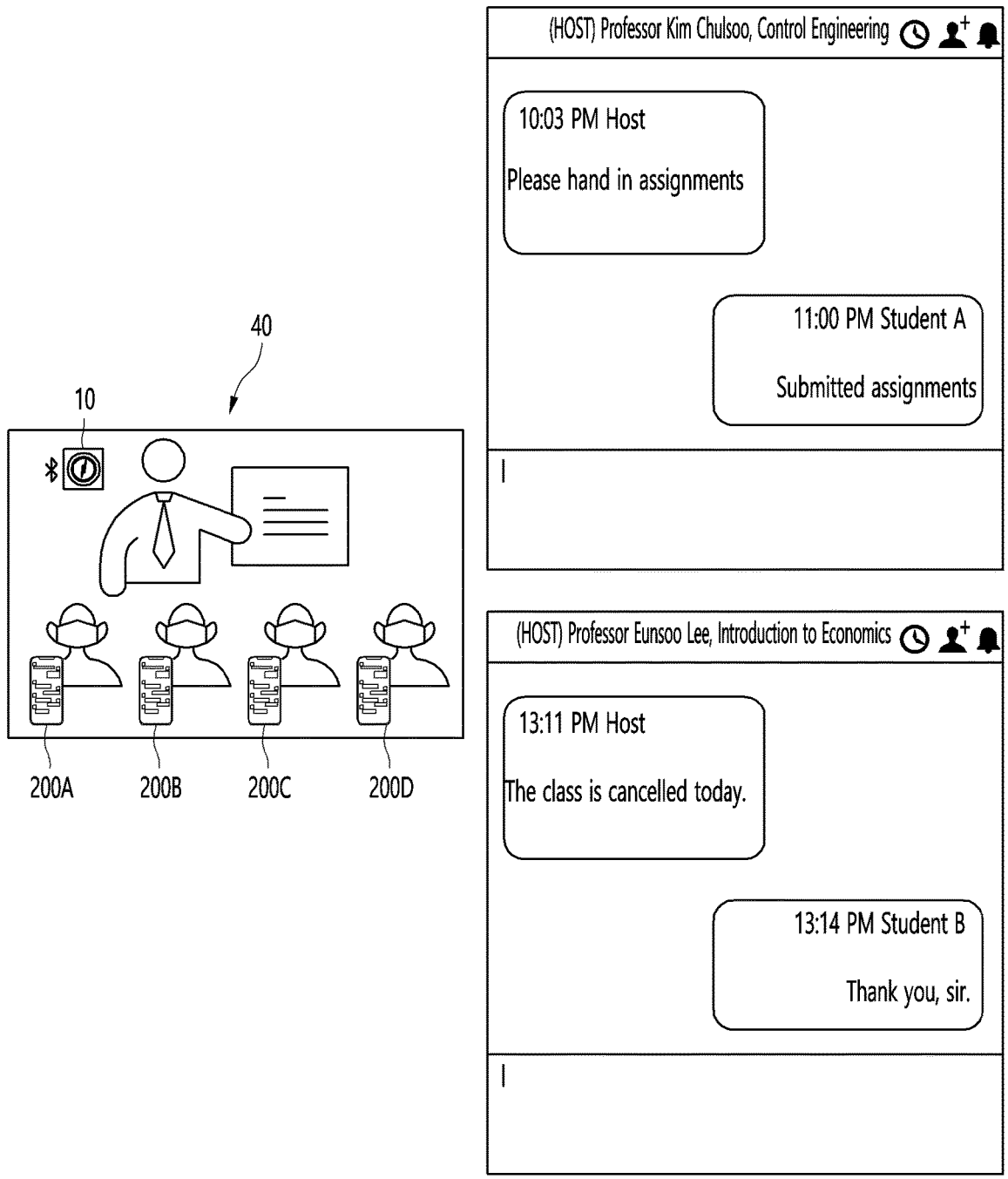
FIG. 10 is a view showing an example in which a beacon is installed in a lecture room.

FIG. 10 is a view showing an application example in which a beacon is installed in a lecture room of a school or a private class. The beacon 100 may be designed to be installed in a lecture room and continuously broadcast ad packets, and in addition, the beacon 100 in FIG. 10 may be controlled to change the host device 250, furthermore, to change the community identifier, according to time zone.

Generally, a lecture room is not occupied and used by any one instructor, but is a space where several instructors occupy and use in turns. Therefore, although a beacon 100 is installed, there may be a problem in that only one instructor may use the beacon 100 when only one host device 250 or chat room is defined. To solve this problem, two or more host devices may be set for one beacon 100 in this embodiment, and a case in which two or more community identifiers may be naturally set according thereto will be described.

What the host device 250 is and what the community identifier is for one beacon 100 may be set through the service server 300, and it is general as described above that as a host inputs a specific beacon registration key issued after the host purchases or obtains the beacon 100, the device of the host may be set as a host device in the service server 300, and a unique community identifier of its own may also be set in this process. However, when a plurality of host devices and a plurality of community identifiers need to be set as shown in this embodiment, an arbitrary host may input and define a plurality of host devices and community identifiers in the service server 300, and particularly, as it is allowed to connect to a specific host device and a specific community through an ad packet by time zone, it is possible to operate a plurality of host devices.

For example, a host (a timetable manager, an academic affair manager, or the like) who has initially purchased the beacon 100 may register that its device is a host device in the service server 300 using a beacon registration key, and then input and register a plurality of host devices and community identifiers by time zone. For example, it is possible to set the device of "Kim Chulsoo" as a host device and "Kim Chulsoo, Control Engineering" as a community identifier between 10:00 and 11:30, and it is possible to set the device of "Eunsu Lee" as a host device and "Professor Eunsoo Lee, Introduction to Economics" as a community identifier between 13:00 and 14:30. In addition to registering these settings in the service server 300, they may be set in the beacon 100 itself to broadcast an ad packet by including community information of different content in each determined time zone when the ad packet is broadcast.

When a beacon 100 is installed in a lecture room like this, it is easy for the students to communicate online with an instructor by simply turning on a Bluetooth network, and there is an effect of enhancing the efficiency of a class as a large amount of data may be shared, in addition to conversation. In addition, it is possible to easily check the attendance status of students from the instructor's view point, and particularly, there is an effect of thoroughly managing attendance since in the case of IoT community service, chat room entry is recorded only when existence of a short distance around the beacon 100 is confirmed.

Using IoT community services in a lecture room may be useful even in an environment in which an infectious disease is severely spread, and since the instructor may track and manage face-to-face contacting situations of students while grasping the attendance status of the students attending the lecture, there is an effect in that tracking and management data may be used for epidemiological investigations on confirmed cases that might occur by any chance. That is, as beacons 100 are installed in all lecture rooms of a school or a private class, an instructor in charge may manage all the student affairs occurring in a lecture room.

Meanwhile, the application of a host device, i.e., the application of an instructor, may further display an interface that can be used by the instructor, and attendance, lateness, early departure, or the like that can be known through whether other devices participating in a community participate in the chat room through the beacon, as well as a dialogue window through which the instructor may chat with the students, may be displayed here. In addition, a menu for confirming attendance at a lecture based on what the students have answered through the dialog window may also be displayed. In addition, a menu for evaluating the class attitude and class concentration on a corresponding lecture with reference to whether the students have confirmed reception of a question of the instructor and the time taken to confirm the reception, whether the students have answered the question of the instructor and the time taken to answer the question, or the like may be displayed on the application of the host device.

Figure 13:
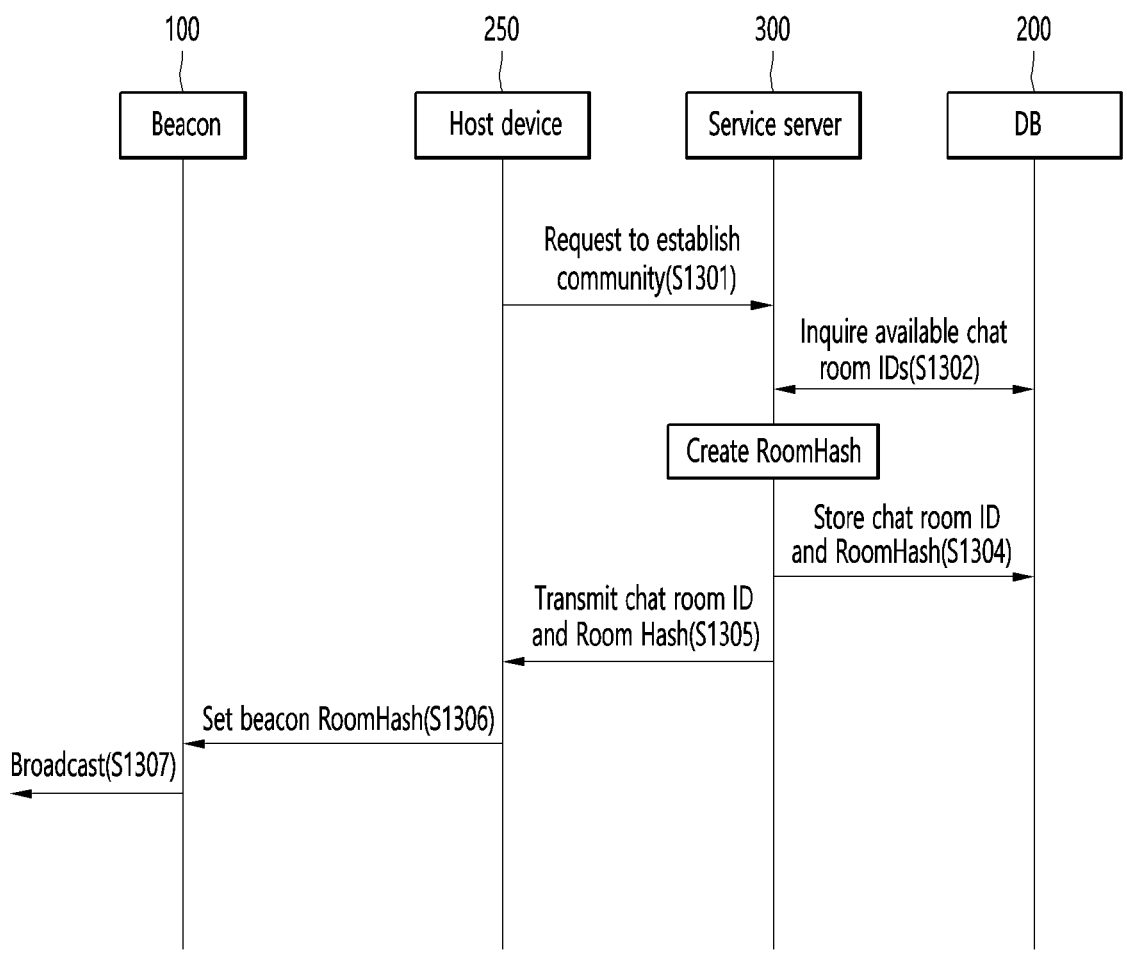
FIG. 13 is a view showing a process in which a RoomHash is created when a chat room is established.

In addition, the application of the host device may display spatial, temporal, and social relationships in the lecture room based on monitoring information, and may be implemented to generate and analyze history data based on accumulated monitoring information. Meanwhile, it is understood that the monitoring function in a lecture room may be used not only in an offline meeting, such as in the lecture room, and may also be used in a non-contact online meeting. In addition, this function is expected to be a starting point of a new type living environment, which will be called as Online & Offline (O&O) in the future, i.e., it may be understood as a starting point of a new paradigm that incorporates online community technologies in an offline living environment. Particularly, when there is a risk of spreading an infectious disease and thus a living environment such as social distancing is routinized, there may be limitations that cannot replace all existing offline living environments with online living environments, and when the community service providing method according to the present invention, particularly, the community service providing method of a form as shown in FIG. 13, is utilized, it is expected that a new living environment incorporating an online living environment may be constructed while maintaining the offline living environment. As described above for example, as long as offline institutions such as universities exist, there are many limitations until the lecture room offline education is completely replaced by online education, and eventually, it will return to the lecture room offline education. At this point, an online chat room service, such as the community service according to the present invention, may be applied rather than a method of conversing and discussing face-to-face between an instructor and students. Particularly, the community service according to the present invention may be utilized as a means for replacing or assisting a method of face-to-face communication. That is, students attend face-to-face lectures in accompany with questions or discussions made in an online method while participating in an online community through the beacon, and attendance and class participation state, class concentration state, and the like are automatically monitored, and an evaluation may be made later based on historical data generated on the basis of the monitoring information. On the other hand, the community service according to the present invention may be used for epidemiological investigations for preventing infectious diseases in a situation in which the infectious diseases are seriously spread, by recording contact history of users when the users are gathered in a space. For example, when a specific person is identified as a patient confirmed as being infected by a disease in a situation where 300 users gather and listen to a lecture or attend a worship service, it may confirm who have stayed close or closer to the specific person. In addition, when the community service according to the present invention is used in a situation in which an infectious disease is seriously spread, social distancing may be efficiently accomplished in a way of allowing offline meetings on condition of providing all kinds of information including history of sending ad packets from the beacon to each of the user devices, signal sensitivity at the time of sending and receiving ad packets, and information on monitoring the use status in a community. Accordingly, the social distancing may be accomplished in a way of conditionally allowing offline meetings, rather than forcing offline meetings in a way of unconditionally excluding contact of people.

Figure 11:
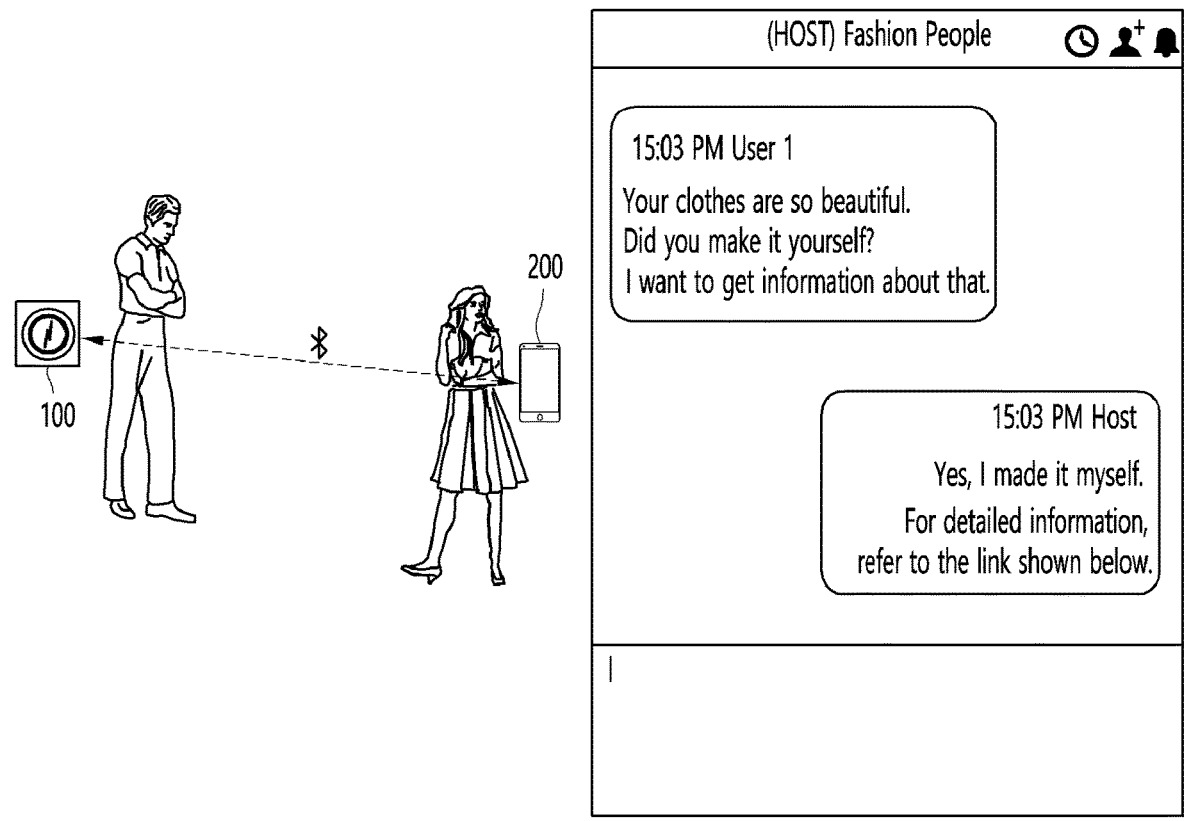
FIG. 11 is a view showing an environment in which an individual may perform marketing while possessing a beacon.

FIG. 11 is a view showing a host carrying a beacon 100 by himself or herself or utilizing a host device as a beacon to promote clothes or accessories that the host wears as an individual through a Bluetooth network. That is, when the host operates the beacon 100 at a specific place or operates the device to broadcast like a beacon, ad packets may propagate to user devices existing in the neighborhood, and it shows an embodiment in which when the people in the neighborhood have an interested after seeing the clothes or accessories of the host, they may obtain more information about the clothes or accessories of the host by participating in the community according to reception of the ad packet. After participating in the community, naturally, they will be able to share information such as a price, a purchase store or the like through conversation or data sharing with the host.

The application example like this may be understood as a promotion of a new offline method, and anyone who possesses a beacon 100 or a device capable of performing a function similar to this may be the subject of the promotion, and therefore, it is possible to create a common profit model of a sponsorship with a selling company. In addition, since almost no cost is required to implement the IoT community service according to the present invention, there is an effect of creating an effective offline promotion place at a very low cost.

Although promotions are made through various SNS services previously, the embodiment as shown in FIG. 11 is different from the conventional SNS method in that people may view the product offline and chat directly with the host in an online space.

Methods of implementing IoT community services using a beacon and application examples thereof have been described above.

Meanwhile, although the IoT community services using a beacon have conveniences as described above, there are some problems, and one of them is that the number of community identifiers, i.e., chat room IDs, is limited to 16,277,216 (24 bits) since only 24 bits of a packet can be used as shown in FIG. 3(b), and another one is that a security problem may occur as a fixed chat room ID is used. Although the problem of limiting the number of community identifiers may be solved by adding a UUID, in this detailed description, a solution called Room Hash is proposed to solve the two problems at the same time.

The Room Hash may also be understood as rotating ID allocation of a counter increment method based on HMAC, and for example, the Room Hash may be implemented by the formula or command shown below.

$$\text{RoomHash} = \text{truncate}(\text{HMAC}(K,C)) \bmod \max$$
$$(\text{RoomHash}), \text{ while RoomHash has been taken,}$$
$$\text{RoomHash} {+}{=} 1$$

K: Private key (including chat room ID), C: Counter (increments at every event)

Allocation of a chat room ID using a RoomHash is allocation by random logic only for a chat room actually in an active state (a chat room currently in use), and the RoomHash is not allocated to chat rooms that have not been broadcast.

Figure 12:
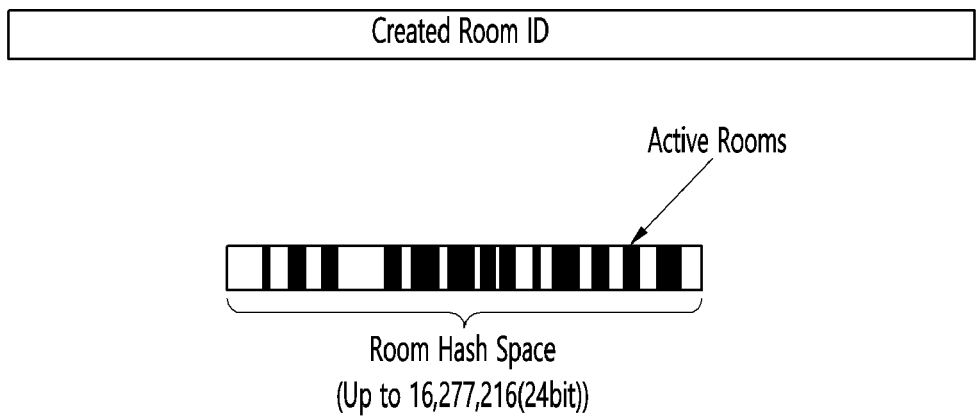
FIG. 12 is a view showing the concept of RoomHash.

FIG. 12 shows a conceptual view for understanding the RoomHash, and referring to this, 24 bits that can be used as a community identifier in the ad packet may be used as a space for recording the RoomHash, and in this case, the total number of chat room IDs may be used without limit according to flexibility of allocating the RoomHash. In addition, although it will be described below, the RoomHash may be included as a community identifier in an ad packet broadcast by the beacon 100, and actually, the community identifier (chat ID) may be safely shared only between the host device and the service server.

FIG. 13 is a view sequentially showing a process of requesting the service server 300 to establish a chat room by the host device 250 and a process of creating a RoomHash according thereto, and first of all, it starts from a step of requesting the service server 300 to establish a chat room by the host device 250 (S1301). At this point, an application for IoT community service may be installed in the host device 250, and from the view point of the host, it may be implemented to perform step S1301 by simply clicking an icon such as "Open chat room" or "Open beacon chat room" in the application.

After step S1301, the service server 300 accesses a database 400 provided in the service server 300 or a database 400 in a separate place connected to the service server 300 through a network, and inquires currently available chat room IDs (S1302). A plurality of chat room IDs for identifying existing chat rooms may be stored in the database 400, and a plurality of unused chat room IDs for opening a new chat room may also be stored in the database 400, and in this step, the service server 300 may inquire unused chat room IDs and take any one of them.

After taking an available chat room ID at step S1302, the service server 300 creates a new RoomHash (S1303), and the created RoomHash is mapped to the previously inquired chat room ID and stored in the database 400 (S1304). Therefore, a new chat room ID and a RoomHash corresponding thereto may match each other and be stored in the database 400.

After step S1304, the service server 300 transmits the chat room ID and the RoomHash to the host device 250 (S1305), and the host device 250 may recognize the chat room ID and the RoomHash. However, at this step, the service server 300 may transmit only the RoomHash to the host device 250 so that the chat room ID may not be exposed fundamentally.

After step S1305, the host device 250 may set a RoomHash of the beacon 100 using a beacon 100 setting menu in the previously installed application (S1306), and after the setting, the beacon 100 may add the RoomHash to the ad packet and begin broadcasting (S1307).

Figure 14:
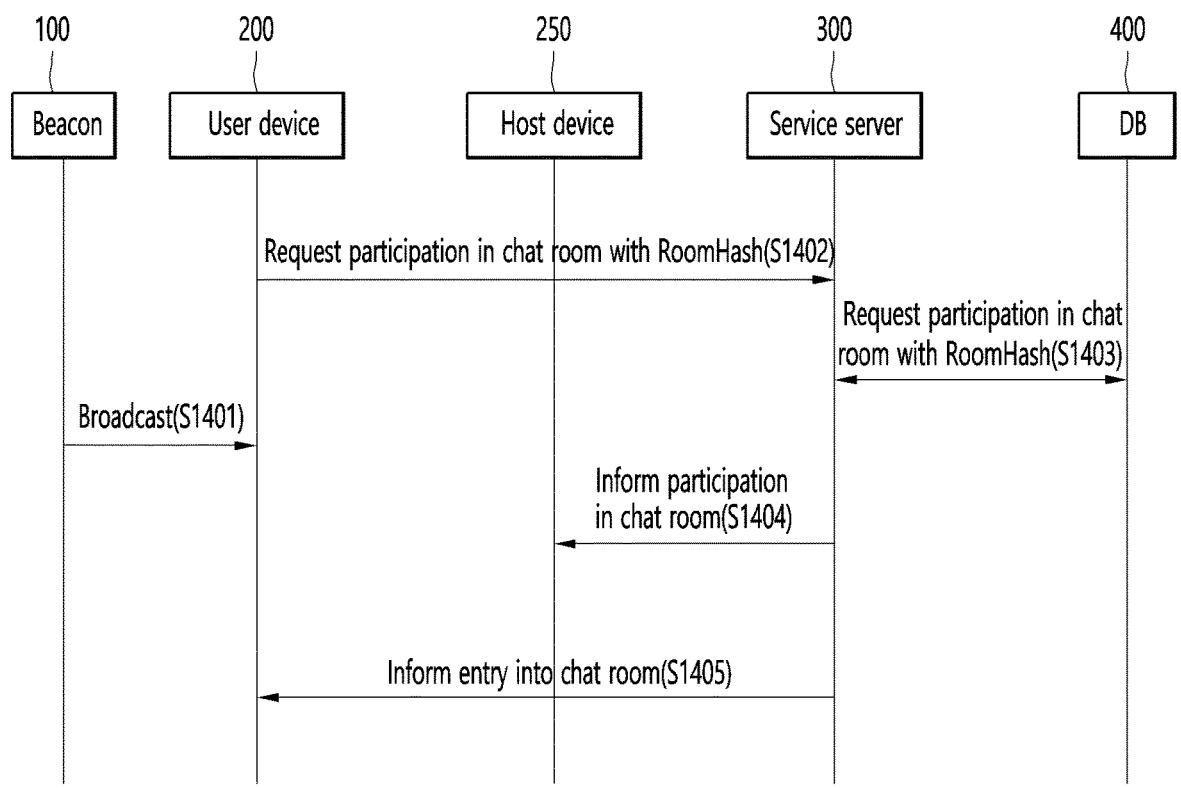
FIG. 14 is a view showing a process in which a user device receiving an ad packet from a beacon requests participation in a chat room.

FIG. 14 shows a process in which an arbitrary user device 200 receiving an ad packet from the beacon 100 participates in a chat room. Referring to FIG. 14, first of all, the user device 200 receives an ad packet broadcast from the beacon 100 (S1401). The user device 200 receiving the ad packet may request the service server 300 participation in a chat room with reference to the RoomHash and the community service identifier (UUID) included in the ad packet (S1402). At this point, an application for using the IoT community service may be installed in the user device 200, and the user may execute the process described above by simply clicking a chat room participation icon on his or her device.

Meanwhile, after step S1402, the service server 300 accesses the database 400 and inquires and acquires a chat room ID corresponding to the RoomHash (S1403). Thereafter, the service server 300 may inform the host device 250 that someone has requested participation in the chat room (S1404), and may inform the user device 200 of entry into the chat room (S1405). Accordingly, the service server 300 may provide the IoT community service between the user device 200 and the host device 250.

Figure 15:
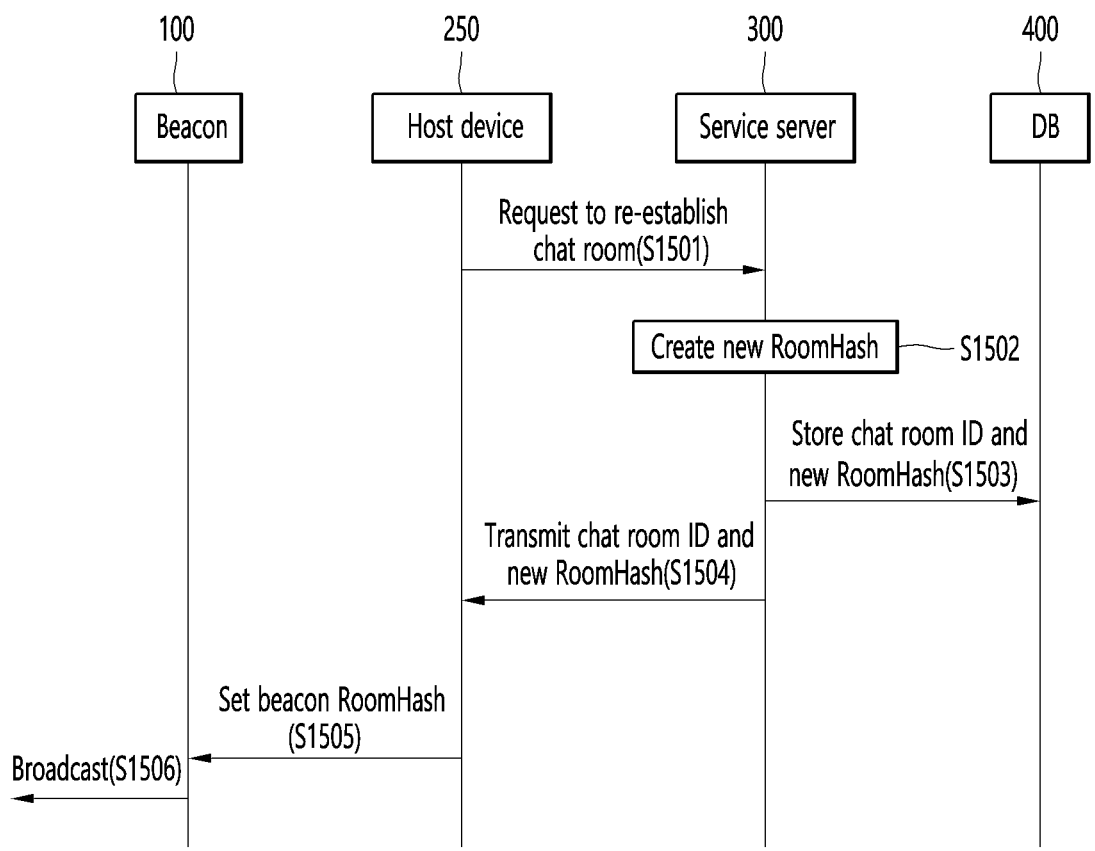
FIG. 15 is a view showing a process in which a new RoomHash is mapped to an existing chat room.

FIG. 15 shows a process of newly activating a chat room, which has been initially established before, as needed, and more accurately, it shows a process of re-creating a RoomHash and mapping the RoomHash to an existing chat room ID.

Referring to FIG. 15, first of all, this embodiment starts from a step of requesting the service server 300 to re-establish the chat room by the host device 250 (S1501). At this point, re-establishment of a chat room should be understood as a concept of activating an existing chat room, unlike establishing a new chat room.

Meanwhile, after step S1501, the service server 300 creates a new RoomHash (S1502), and stores it in the database 400 together with the chat room ID (S1503).

After step S1503, the service server 300 transfers the chat room ID and the new RoomHash to the host device 250 (S1504), and thereafter, the host device 250 performs a beacon setting process (S1505) and controls the beacon to include the new RoomHash in an ad packet and broadcast the ad packet (S1506).

As shown in FIG. 15, the process of creating a new RoomHash and mapping and storing the new RoomHash with a chat room ID may be performed as needed, and for example, when the chat room is deactivated as it has not been used for a long time, or when an existing RoomHash is not valid as the RoomHash mapped to an existing chat room ID is mapped to another chat room ID, or when the RoomHash needs to be updated periodically to enhance security, the process of FIG. 15 may be performed.

A method of providing an IoT community service using a beacon and a system for the same have been described above. Meanwhile, the present invention is not limited to the specific embodiments and application examples described above, and various modified embodiments are possible by those skilled in the art without departing from the gist of the present invention as claimed in the claims. These modified embodiments should not be understood as being distinguished from the technical spirit or prospect of the present invention.

The invention claimed is:

1. A method of providing an IoT community service using a beacon by a service server, the method comprising the steps of:
receiving, by the service server, host registration request from a host device, where the host registration request includes a user identification information, and a beacon registration key;
registering, by the service server, the host device after performing validity verification on the beacon registration key; and
receiving, by the service server, a community identifier from the host device, where the community identifier is for identifying a community corresponding to the beacon established by the service server, and is determined by a user of the host device,
wherein the beacon is assigned with a unique UUID for identifying that the beacon is for providing the community service, and
wherein the beacon registration key is provided for registering the host device when the beacon is purchased.

2. The method according to claim 1,
after the host device is registered, receiving a community participation request from a user device, by the service server, where the community participation request includes an ad packet received from the beacon;
inquiring, by the service server, the community corresponding to the beacon with reference to the community identifier included in the ad packet; and
allowing, by the service server, entry of the user device in the community.

3. The method according to claim 2, wherein the beacon is installed in a vehicle, and the community identifier is a number, a character, or a combination of these for identifying the vehicle or a driver of the vehicle.

4. The method according to claim 2, wherein the beacon is installed in a workplace, and the community identifier is a number, a character, or a combination of these for identifying the workplace or a manager of the workplace.

5. The method according to claim 2, wherein the beacon is installed in a house, and the community identifier is a number, a character, or a combination of these for identifying the house, an electronic device installed in the house, or a resident of the house.

6. The method according to claim 2, wherein the beacon is installed in an elevator of a collective residential building, and the community identifier is a number, a character, or a combination of these for identifying a management office of the collective residential building, an employee of the management office, or a manager in charge of maintenance of the elevator.

7. The method according to claim 2, wherein the beacon is installed in a lecture room, and the community identifier is a number, a character, or a combination of these for identifying the lecture room, a title of a lecture provided in the lecture room, or a name of an instructor.

8. The method according to claim 2, wherein the beacon may be carried by a user, and the community identifier is a number, a character, or a combination of these for identifying the user or arbitrary goods or service specified by the user.

* * * * *